United States Patent
Chan et al.

(10) Patent No.: US 9,623,800 B2
(45) Date of Patent: Apr. 18, 2017

(54) TOUCH SENSING MIRROR STRUCTURE

(71) Applicant: UNIDISPLAY INC., Hsinchu County (TW)

(72) Inventors: Meng-Chia Chan, Taichung (TW); Tse-Hu Chang, Taichung (TW)

(73) Assignee: UNIDISPLAY INC., Hsinchu County (TW)

( * ) Notice: Subject to any disclaimer, the term of this patent is extended or adjusted under 35 U.S.C. 154(b) by 0 days.

(21) Appl. No.: 14/943,040

(22) Filed: Nov. 17, 2015

(65) Prior Publication Data

US 2016/0167584 A1 Jun. 16, 2016

(30) Foreign Application Priority Data

Dec. 16, 2014 (TW) .............................. 103143849 A

(51) Int. Cl.
*G02F 1/153* (2006.01)
*G09G 3/38* (2006.01)
(Continued)

(52) U.S. Cl.
CPC ............ *B60R 1/088* (2013.01); *B60Q 1/2665* (2013.01); *G02F 1/155* (2013.01); *G02F 1/157* (2013.01);
(Continued)

(58) Field of Classification Search
CPC . G02F 1/15; G02F 1/153; G02F 1/155; G02F 1/157; G02F 1/161; G02F 1/163;
(Continued)

(56) References Cited

U.S. PATENT DOCUMENTS 6,111,684 A * 8/2000 Forgette ............... B60Q 1/2665
359/265
6,870,656 B2 * 3/2005 Tonar ................... B60Q 1/2665
359/265
(Continued)

FOREIGN PATENT DOCUMENTS

TW 200613232 5/2006
TW 201017226 5/2010
(Continued)

OTHER PUBLICATIONS

"Office Action of Taiwan Counterpart Application, application No. 103143849", issued on Dec. 7, 2015, p. 1-p. 5.
(Continued)

*Primary Examiner* — Loha Ben
(74) *Attorney, Agent, or Firm* — Jianq Chyun IP Office

(57) ABSTRACT

A touch sensing mirror structure including a first transparent substrate, a second transparent substrate, a package material, an electrochromic material, a light reflecting electrode layer, and a transparent electrode layer is provided. The second transparent substrate is located above the first transparent substrate. The package material is bonded between the first transparent substrate and the second transparent substrate to define a chamber between the first transparent substrate and the second transparent substrate. The chamber is filled with the electrochromic material. The light reflecting electrode layer is disposed on the first transparent substrate and contacts the electrochromic material. The transparent electrode layer is disposed on the second transparent substrate and contacts the electrochromic material.

10 Claims, 3 Drawing Sheets

(51) Int. Cl.
*B60R 1/08* (2006.01)
*G02F 1/155* (2006.01)
*G02F 1/157* (2006.01)
*G02F 1/163* (2006.01)
*B60Q 1/26* (2006.01)
*G06F 3/044* (2006.01)
*C09K 9/00* (2006.01)
*G02F 1/1333* (2006.01)
*G02F 1/1335* (2006.01)
*G02F 1/161* (2006.01)
*B60R 1/12* (2006.01)

(52) U.S. Cl.
CPC ............ *G02F 1/1533* (2013.01); *G02F 1/163* (2013.01); *G06F 3/044* (2013.01); *B60R 2001/1215* (2013.01); *C09K 9/00* (2013.01); *G02F 1/13338* (2013.01); *G02F 1/133502* (2013.01); *G02F 1/161* (2013.01); *G02F 2001/1536* (2013.01); *G02F 2201/38* (2013.01); *G02F 2201/503* (2013.01); *G02F 2201/58* (2013.01); *G09G 3/38* (2013.01)

(58) Field of Classification Search
CPC ........... G02F 1/133502; G02F 1/13338; G02F 1/1533; G02F 2001/1502; G02F 2001/1512; G02F 2001/1536; G02F 2001/1552; G02F 2201/38; G02F 2201/58; G02F 2201/503; B60R 1/088; B60R 1/1207; B60R 2001/1215; B60Q 1/2665; C09K 9/00; C09K 9/02; G06F 3/044; G09G 3/38
USPC ................................. 359/265, 267, 273, 274
See application file for complete search history.

(56) References Cited

U.S. PATENT DOCUMENTS

| | | | |
|---|---|---|---|
| 7,009,751 B2* | 3/2006 | Tonar | B60Q 1/2665 307/10.1 |
| 7,324,261 B2* | 1/2008 | Tonar | C09K 9/02 359/265 |
| 7,663,798 B2* | 2/2010 | Tonar | B60Q 1/2665 359/265 |
| 7,821,696 B2* | 10/2010 | Tonar | B60Q 1/2665 359/265 |
| 7,830,583 B2* | 11/2010 | Neuman | B60R 1/088 359/265 |
| 8,228,590 B2* | 7/2012 | Baumann | B60R 1/088 359/265 |
| 8,508,832 B2* | 8/2013 | Baumann | B60R 1/088 359/267 |
| 2002/0044065 A1 | 4/2002 | Quist et al. | |
| 2007/0279752 A1 | 12/2007 | McCabe et al. | |
| 2009/0015736 A1 | 1/2009 | Weller et al. | |
| 2009/0096937 A1 | 4/2009 | Bauer et al. | |

FOREIGN PATENT DOCUMENTS

| | | |
|---|---|---|
| TW | 201131253 | 9/2011 |
| TW | 201222117 | 6/2012 |
| TW | 201300919 | 1/2013 |
| TW | 201411259 | 3/2014 |

OTHER PUBLICATIONS

"Office Action of Taiwan Counterpart Application, application No. 104105636", issued on Dec. 14, 2015, p. 1-p. 5.

* cited by examiner

TOUCH SENSING MIRROR STRUCTURE

CROSS-REFERENCE TO RELATED APPLICATION

This application claims the priority benefit of Taiwan application serial no. 103143849, filed on Dec. 16, 2014. The entirety of the above-mentioned patent application is hereby incorporated by reference herein and made a part of this specification.

FIELD OF DISCLOSURE

The invention relates to a mirror structure. More particularly, the invention relates to a touch sensing mirror structure.

DESCRIPTION OF RELATED ART

When a user observes a mirror structure (e.g., a display screen of a rear-view mirror, a dashboard, or an in-vehicle electronic apparatus) at night or in a dark environment, as long as a light beam from an external light source is projected onto the mirror structure, a portion of the light beam may encounter the issue of mirror reflection. In such a dark environment, the user exposed to the significant amount of light may be dazzled, may suffer from the glare, or may even experience temporary vision loss (e.g., disability glare or blinding glare) because the visual field brightness is far greater than the luminance to which the eyes of the user are adapted.

SUMMARY

The invention is directed to a touch sensing mirror structure capable of resolving the issue of glare caused by mirror reflection.

In an embodiment of the invention, a touch sensing mirror structure that includes a first transparent substrate, a second transparent substrate, a package material, an electrochromic material, a light reflecting electrode layer, and a transparent electrode layer is provided. The second transparent substrate is located above the first transparent substrate. The package material is bonded between the first transparent substrate and the second transparent substrate to define a chamber between the first transparent substrate and the second transparent substrate. The chamber is filled with the electrochromic material. The light reflecting electrode layer is disposed on the first transparent substrate and contacts the electrochromic material. The transparent electrode layer is disposed on the second transparent substrate and contacts the electrochromic material.

According to an embodiment of the invention, the touch sensing mirror structure further includes a power supply, wherein the power supply is electrically connected to the light reflecting electrode layer and the transparent electrode layer.

According to an embodiment of the invention, the touch sensing mirror structure further includes a photo-sensing element electrically connected to the power supply. When the photo-sensing element senses a light beam projected to the second transparent substrate, the power supply supplies a voltage to the light reflecting electrode layer and the transparent electrode layer and generates an electric field between the light reflecting electrode layer and the transparent electrode layer to reduce light reflectivity of the touch sensing mirror structure under the electric field.

According to an embodiment of the invention, the electrochromic material is changed from a transparent state to a non-transparent state under the electric field.

According to an embodiment of the invention, the transparent electrode layer includes a transparent conductive material layer and an anti-shatter film. The anti-shatter film is disposed on the second transparent substrate, the transparent conductive material layer is disposed on the anti-shatter film, and the anti-shatter film is located between the transparent conductive material layer and the second transparent substrate.

According to an embodiment of the invention, the touch sensing mirror structure further includes a first anti-shatter film and a touch sensing layer. The first anti-shatter film is disposed on the second transparent substrate. The first anti-shatter film and the transparent electrode layer are located at two respective sides of the second transparent substrate. The touch sensing layer is disposed on the first anti-shatter film, and the first anti-shatter film is located between the touch sensing layer and the second transparent substrate.

According to an embodiment of the invention, the transparent electrode layer includes a transparent conductive material layer and a second anti-shatter film. The second anti-shatter film is disposed on the second transparent substrate, the transparent conductive material layer is disposed on the second anti-shatter film, and the second anti-shatter film is located between the transparent conductive material layer and the second transparent substrate.

According to an embodiment of the invention, the transparent electrode layer includes a transparent touch sensing layer and an anti-shatter film. The anti-shatter film is disposed on the second transparent substrate. The transparent touch sensing layer is disposed on the anti-shatter film, and the anti-shatter film is located between the transparent touch sensing layer and the second transparent substrate.

According to an embodiment of the invention, the package material includes a spacer and a sealant. The spacer leans against the first transparent substrate and the second transparent substrate. The sealant encapsulates the spacer and is bonded between the first transparent substrate and the second transparent substrate.

According to an embodiment of the invention, the transparent electrode layer faces the light reflecting electrode layer, and the electrochromic material is located between the transparent electrode layer and the light reflecting electrode layer.

In view of the above, the electrochromic material is integrated into the touch sensing mirror structure; thereby, after the touch sensing mirror structure receives the light from the external light source, the light reflectivity of the touch sensing mirror structure may be reduced because the electrochromic material is changed from the transparent state to the non-transparent state. As a result, the issue of glare resulting from the mirror reflection can be resolved to a better extent.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings

DETAILED DESCRIPTION OF DISCLOSED EMBODIMENTS

Figure 1:
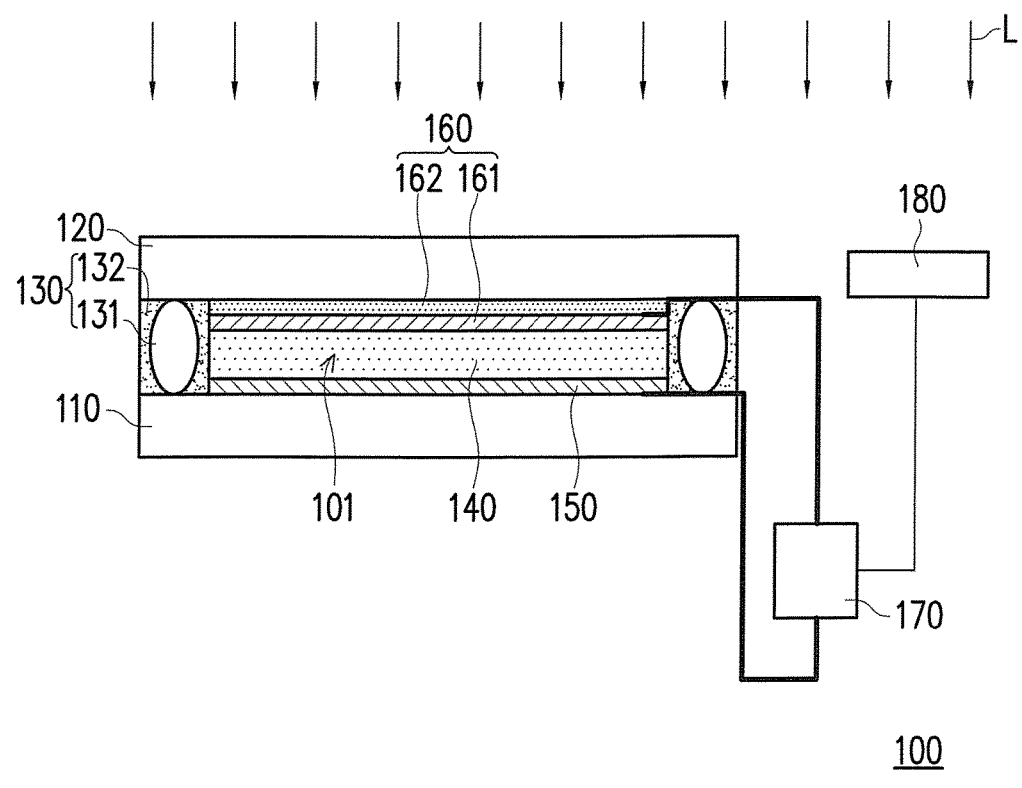
FIG. 1 is a schematic diagram of a touch sensing mirror structure according to an embodiment of the invention.

FIG. 1 is a schematic diagram of a touch sensing mirror structure according to an embodiment of the invention. With reference to FIG. 1, in the present embodiment, the touch sensing mirror structure 100 may include a first transparent substrate 110, a second transparent substrate 120, a package material 130, an electrochromic material 140, a light reflecting electrode layer 150, and a transparent electrode layer 160. The first transparent substrate 110 and the second transparent substrate 120 are opposite to each other and are made of transparent glass, acrylic, or any other appropriate light-transmissive material, for instance.

In order to ensure that a certain gap exists between the first transparent substrate 110 and the second transparent substrate 120, the spacer 131 is disposed between the first transparent substrate 110 and the second transparent substrate 120, such that the second transparent substrate 120 is supported by the spacer 131 and thus disposed above the first transparent substrate 110. On the other hand, in order to allow the first transparent substrate 110 and the second transparent substrate 120 to be securely bonded together, a sealant 132 may be disposed between the first transparent substrate 110 and the second transparent substrate 120. Here, the package material 130 is composed of the spacer 131 and the sealant 132, for instance. The sealant 132 encapsulates the spacer 131 and is bonded to the first transparent substrate 110 and the second transparent substrate 120. Generally, the sealant 132 may be a light curing adhesive, a thermal curing adhesive, or a mixture of the light curing adhesive and the thermal curing adhesive, which should not be construed as a limitation to the invention.

Namely, the package material 130 described in the present embodiment may be bonded between the first transparent substrate 110 and the second transparent substrate 120 and may define a chamber 101 between the first transparent substrate 110 and the second transparent substrate 120. Here, the package material 130 not only can support the second transparent substrate 120 to be located above the first transparent substrate 110 and serve to bond the first transparent substrate 110 and the second transparent substrate 120 to each other but also can isolate the external moisture or dust from the chamber 101; thereby, the components in the chamber 101 can be prevented from being damaged or destroyed by the external moisture or dust. For instance, the sealant 132 may be mixed with a water absorbing material, or the spacer 131 may be made of a water absorbing material, so as to prevent the external moisture or dust from entering the chamber 101.

According to an embodiment of the invention, the chamber 101 is filled with the electrochromic material 140, and the electrochromic material 140 may be an inorganic material or an organic material. The inorganic material may be metal oxide or metal complex held by covalent bonds. Here, the metal oxide may be transition metal oxide (e.g., $WO_3$, $MoO_3$, $V_2O_5$, $Nb_2O_5$, NiO, SnO, $Fe_2O_3$, CoO, $Ir_2O_3$, $Rh_2O_3$, or $MnO_2$), and the metal complex held by covalent bonds may be Prussian blue, for instance. The organic material is, for instance, polymers formed by aniline monomer, EDOT monomer, or Viologen monomer.

In order for an electrochemical redox reaction to occur in the electrochromic material 140 with electroactive properties under an electric field, which may lead to the issue of gaining or losing electrons and may change the energy level of the electrochromic material 140 and accordingly change the color, the light reflecting electrode layer 150 is disposed on the first transparent substrate 110, and the transparent electrode layer 160 is disposed on the second transparent substrate 120. Here, both the light reflecting electrode layer 150 and the transparent electrode layer 160 are in contact with the electrochromic material 140. From another perspective, the light reflecting electrode layer 150 and the transparent electrode layer 160 are opposite to each other, and the electrochromic material 140 is located between the light reflecting electrode layer 150 and the transparent electrode layer 160. The touch sensing mirror structure 100 may further include a power supply 170 and a photo-sensing element 180. The power supply 170 is electrically connected to the light reflecting electrode layer 150 and the transparent electrode layer 160, and the photo-sensing element 180 is electrically connected to the power supply 170. In general, the power supply 170 may be a direct current (DC) power supply; for instance, an anode of the power supply 170 may be connected to the light reflecting electrode layer 150, and a cathode of the power supply 170 may be connected to the transparent electrode layer 160. Alternatively, a cathode of the power supply 170 may be connected to the light reflecting electrode layer 150, and an anode of the power supply 170 may be connected to the transparent electrode layer 160. The invention is not limited thereto.

If the photo-sensing element 180 senses a light beam L projected to the second transparent substrate 120, the photo-sensing element 180 sends a control signal to the power supply 170. The power supply 170 then provides a voltage to the light reflecting electrode layer 150 and the transparent electrode layer 160 according to the control signal and generates an electric field between the light reflecting electrode layer 150 and the transparent electrode layer 160. Under the electric field, an electrochemical redox reaction may occur in the electrochromic material 140, and thus the electrochromic material 140 may encounter the issue of gaining or losing electrons and may be changed from a transparent state to a non-transparent state, such that the light reflectivity of the touch sensing mirror structure 100 is reduced. From another perspective, since the electrochromic material 140 is changed from the transparent state to the non-transparent state, most of the light beam L projected to the second transparent substrate 120 is absorbed by the electrochromic material 140, so as to adjust the intensity of the reflected light and thereby prevent glare.

As shown in FIG. 1, compared to the conventional color-changing mirror structure in which a single-layer transparent conductive layer is disposed on two respective sides of the electrochromic material, the mirror structure provided herein has the transparent electrode layer 160 that may include a transparent touch sensing layer 161 and an anti-shatter film (ASF) 162. Hence, the transparent electrode layer 160 provided herein is substantially a composite film layer. The power supply 170 is connected to the transparent touch sensing layer 161 with its anode or cathode, and the transparent touch sensing layer 161 may be composed by indium tin oxide (ITO), indium zinc oxide (IZO), or other transparent conductive materials. Since the transparent electrode layer 160 includes the touch sensing layer 161, the touch sensing mirror structure 100 may be integrated into an in-car electronic apparatus or any other electronic apparatus and serve as the operating and display interface of the in-car electronic apparatus or any other electronic apparatus. That is, the touch sensing function can be provided by the transparent touch sensing layer 161 integrated into the touch sensing mirror structure 100. On the other hand, the ASF 162 is disposed on the second transparent substrate 120, and the transparent touch sensing layer 161 is disposed on the ASF 162. That is, the ASF 162 is located between the transparent touch sensing layer 161 and the second transparent substrate 120. In most cases, the ASF 162 may be made of polyethylene terephthalate and can prevent the touch sensing mirror structure 100 from being broken and torn apart due to improper use or damages caused by an external force.

In most cases, the ASF 162 may be made of polyethylene terephthalate and can prevent the touch sensing mirror structure 100 from being broken and torn apart due to improper use or damages caused by an external force. Specifically, the ASF 162 is an optical film with low reflectivity or an anti-glare film, for instance, and therefore most of the light beam L projected to the second transparent substrate 120 penetrates the ASF 162 and is absorbed by the electrochromic material 140 changed to the non-transparent state, so as to adjust the intensity of the reflected light and thereby prevent glare. That is, in the dark environment, if the touch sensing mirror structure 100 receives the light with large intensity, the intensity of the reflected light may be adjusted through the electrochromic material 140, the ASF 162, or both the electrochromic material 140 and the ASF 162, so as to prevent the significant amount of reflected light from being directly projected to the user's eyes and thus causing the temporary vision loss of the user.

It should be mentioned that the transparent electrode layer in other feasible embodiments may be composed of a transparent conductive material layer (e.g., ITO or IZO) which cannot perform the touch sensing function and the ASF; the invention is not limited thereto.

Other embodiments are given hereinafter for explanation. It should be mentioned that reference numbers and some descriptions provided in the previous exemplary embodiment are also applied in the following exemplary embodiment. The same reference numbers represent the same or similar components in these exemplary embodiments, and repetitive descriptions are omitted. The omitted descriptions may be found in the previous exemplary embodiments.

Figure 2:
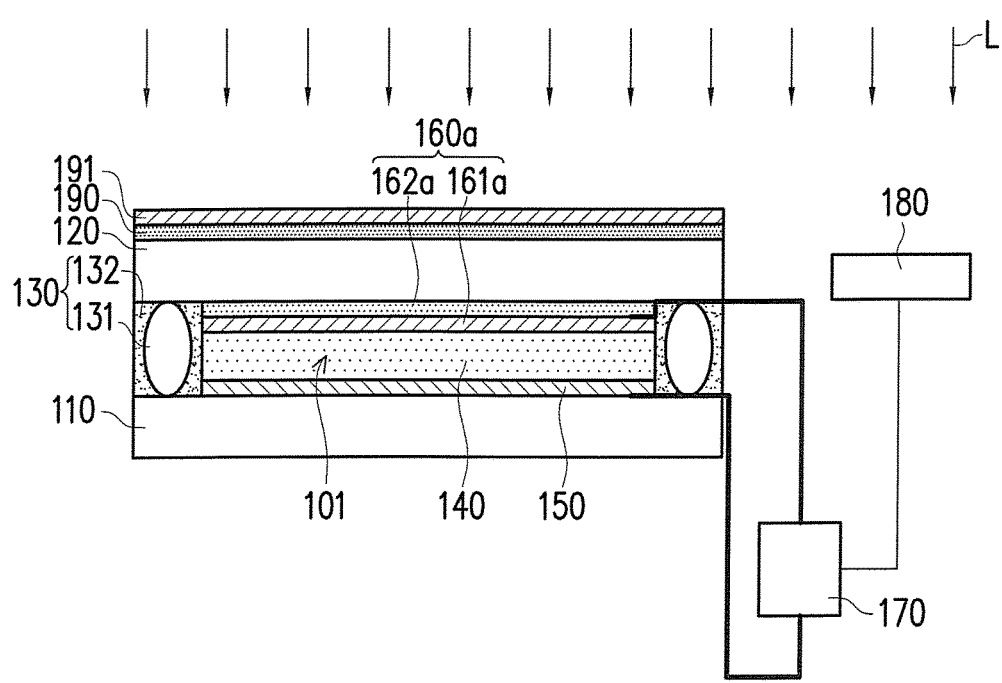
FIG. 2 is a schematic diagram of a touch sensing mirror structure according to another embodiment of the invention.

FIG. 2 is a schematic diagram of a touch sensing mirror structure according to another embodiment of the invention. With reference to FIG. 2, the touch sensing mirror structure 100A provided in the present embodiment is similar to the touch sensing mirror structure 100 depicted in FIG. 1, and one of the differences therebetween lies in that the touch sensing mirror structure 100A further includes an ASF 190 and a touch sensing layer 191. The ASF 190 is disposed on the second transparent substrate 120, and the ASF 190 and the transparent electrode layer 160a are located at two respective sides of the second transparent substrate 120. The touch sensing layer 191 is disposed on the ASF 190; namely, the ASF 190 is located between the touch sensing layer 191 and the second transparent substrate 120. According to the present embodiment, the touch sensing layer 191 may be made of a transparent conductive material, e.g., ITO or IZO, and the transparent electrode layer 160a is composed of a transparent conductive material layer 161a (e.g., ITO or IZO) which cannot perform the touch sensing function and the ASF 162a.

Since the touch sensing layer 191 is integrated into the touch sensing mirror structure 100A described herein, the touch sensing mirror structure 100A may also be integrated into an in-car electronic apparatus or any other electronic apparatus and serve as the operating and display interface of the in-car electronic apparatus or any other electronic apparatus. That is, the touch sensing function can be provided by the touch sensing layer 191 integrated into the touch sensing mirror structure 100A. In another aspect, the ASF 162a and the ASF 190 are optical films with low reflectivity or anti-glare films, for instance, and therefore most of the light beam L projected to the second transparent substrate 120 penetrates the ASF 190 and the ASF 162a and is absorbed by the electrochromic material 140 changed to the non-transparent state, so as to adjust the intensity of the reflected light and thereby prevent glare. That is, in the dark environment, if the touch sensing mirror structure 100A receives the light with large intensity, the intensity of the reflected light may be adjusted through the electrochromic material 140, the ASF 162a, the ASF 190, or the electrochromic material 140 and the ASFs 162a and 190 all together, so as to prevent the significant amount of reflected light from being directly projected to the user's eyes and thus causing the temporary vision loss of the user.

Figure 3:
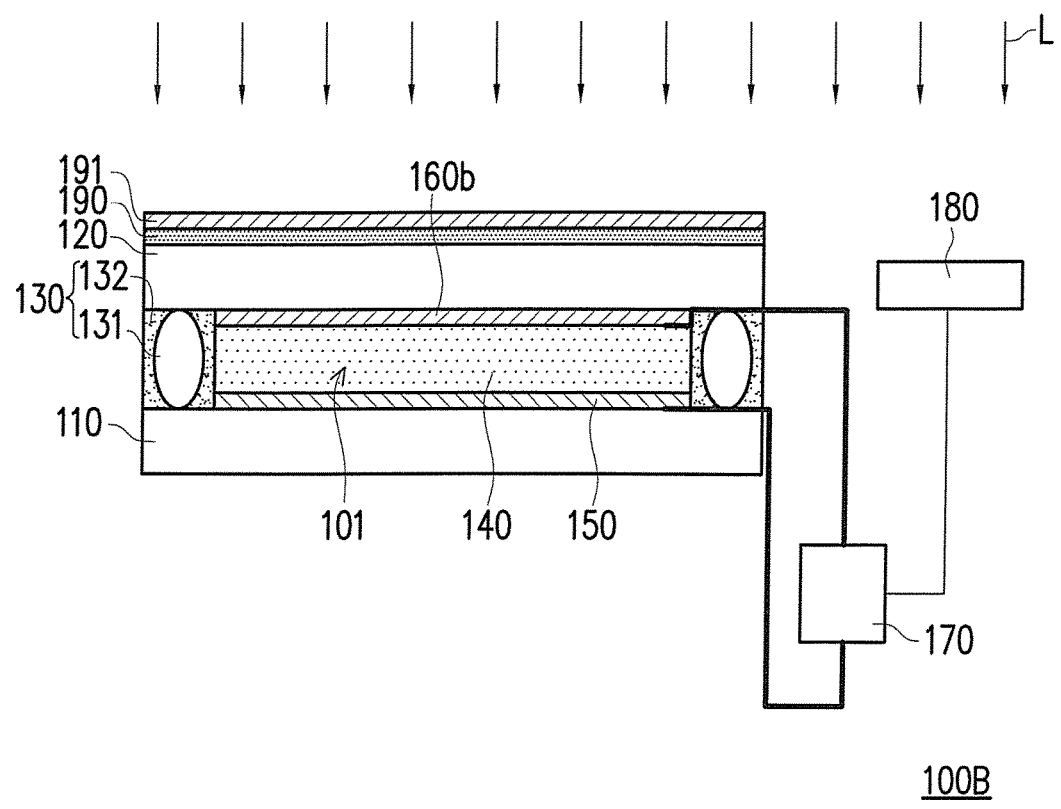
FIG. 3 is a schematic diagram of a touch sensing mirror structure according to still another embodiment of the invention.

FIG. 3 is a schematic diagram of a touch sensing mirror structure according to still another embodiment of the invention. With reference to FIG. 3, the touch sensing mirror structure 100B provided in the present embodiment is similar to the touch sensing mirror structure 100A depicted in FIG. 2, and one of the differences therebetween lies in that the transparent electrode layer 160b is a transparent conductive material layer (e.g., ITO or IZO) that cannot perform any touch sensing function, and there is no ASF connected between the second transparent substrate 120 and the transparent electrode layer 160b. That is, the transparent electrode layer 160b and the ASF 190 are located at two respective sides of the second transparent substrate 120. Since the ASF 190 is an optical film with low reflectivity or an anti-glare film, for instance, most of the light beam L projected to the second transparent substrate 120 penetrates the ASF 190 and is absorbed by the electrochromic material 140 changed to the non-transparent state, so as to adjust the intensity of the reflected light and thereby prevent glare. That is, in the dark environment, if the touch sensing mirror structure 100B receives the light with large intensity, the intensity of the reflected light may be adjusted through the electrochromic material 140, the ASF 190, or both the electrochromic material 140 and the ASF 190, so as to prevent the significant amount of reflected light from being directly projected to the user's eyes and thus causing the temporary vision loss of the user.

To sum up, the electrochromic material is integrated into the touch sensing mirror structure, such that the photosensing element of the touch sensing mirror structure may issue the control signal to the power supply after sensing the light beam projected to the second transparent substrate. The power supply then provides a voltage to the light reflecting electrode layer and the transparent electrode layer according to the control signal and generates an electric field between the light reflecting electrode layer and the transparent electrode layer. Under the electric field, an electrochemical redox reaction may occur in the electrochromic material; hence, the electrochromic material may encounter the issue of gaining or losing electrons, and the electrochromic material may be changed from a transparent state to a non-transparent state, such that the light reflectivity of the touch sensing mirror structure is reduced. From another perspective, since the electrochromic material is changed from the transparent state to the non-transparent state, most of the light beam projected to the second transparent substrate is absorbed by the electrochromic material, so as to adjust the intensity of the reflected light and thereby prevent glare.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A mirror structure comprising:
    a first transparent substrate;
    a second transparent substrate, located above the first transparent substrate;
    a package material, bonded between the first transparent substrate and the second transparent substrate to define a chamber between the first transparent substrate and the second transparent substrate;
    an electrochromic material, the chamber being filled with the electrochromic material;
    a light reflecting electrode layer, disposed on the first transparent substrate, the light reflecting electrode layer contacting the electrochromic material; and
    a transparent electrode layer, disposed on the second transparent substrate, the transparent electrode layer contacting the electrochromic material, wherein the transparent electrode layer comprises a first anti-shatter film, the first anti-shatter film disposed on the second transparent substrate.

2. The mirror structure as claimed in claim 1, further comprising:
    a power supply, electrically connected to the light reflecting electrode layer and the transparent electrode layer.

3. The mirror structure as claimed in claim 2, further comprising:
    a photo-sensing element, electrically connected to the power supply, wherein, when the photo-sensing element senses a light beam projected to the second transparent substrate, the power supply supplies a voltage to the light reflecting electrode layer and the transparent electrode layer and generates an electric field between the light reflecting electrode layer and the transparent electrode layer to reduce light reflectivity of the touch sensing mirror structure under the electric field.

4. The mirror structure as claimed in claim 3, wherein the electrochromic material is changed from a transparent state to a non-transparent state under the electric field.

5. The mirror structure as claimed in claim 1, wherein the transparent electrode layer further comprises a transparent conductive material layer, the transparent conductive material layer disposed on the first anti-shatter film; and wherein the first anti-shatter film is located between the transparent conductive material layer and the second transparent substrate.

6. The mirror structure as claimed in claim 1, further comprising:
    a second anti-shatter film, disposed on the second transparent substrate, the second anti-shatter film and the transparent electrode layer being located at two respective sides of the second transparent substrate; and
    a touch sensing layer, disposed on the second anti-shatter film, the second anti-shatter film being located between the touch sensing layer and the second transparent substrate.

7. The mirror structure as claimed in claim 6, wherein the transparent electrode layer further comprises a transparent conductive material layer, the transparent conductive material layer disposed on the first anti-shatter film; and wherein the first anti-shatter film is located between the transparent conductive material layer and the second transparent substrate.

8. The mirror structure as claimed in claim 1, wherein the transparent electrode layer further comprises a transparent touch sensing layer, the transparent touch sensing layer disposed on the first anti-shatter film; and wherein the first anti-shatter film is located between the transparent touch sensing layer and the second transparent substrate.

9. The mirror structure as claimed in claim 1, wherein the package material comprises a spacer and a sealant, the spacer abutting against the first transparent substrate and the second transparent substrate; and wherein the sealant encapsulating the spacer is bonded between the first transparent substrate and the second transparent substrate.

10. The mirror structure as claimed in claim 1, wherein the transparent electrode layer faces the light reflecting electrode layer, and the electrochromic material is located between the transparent electrode layer and the light reflecting electrode layer.

* * * * *